Nov. 24, 1931.  B. N. WALLIS  1,833,696
STRUCTURE OF WINGS FOR AIRCRAFT
Filed Oct. 9, 1930  5 Sheets-Sheet 1
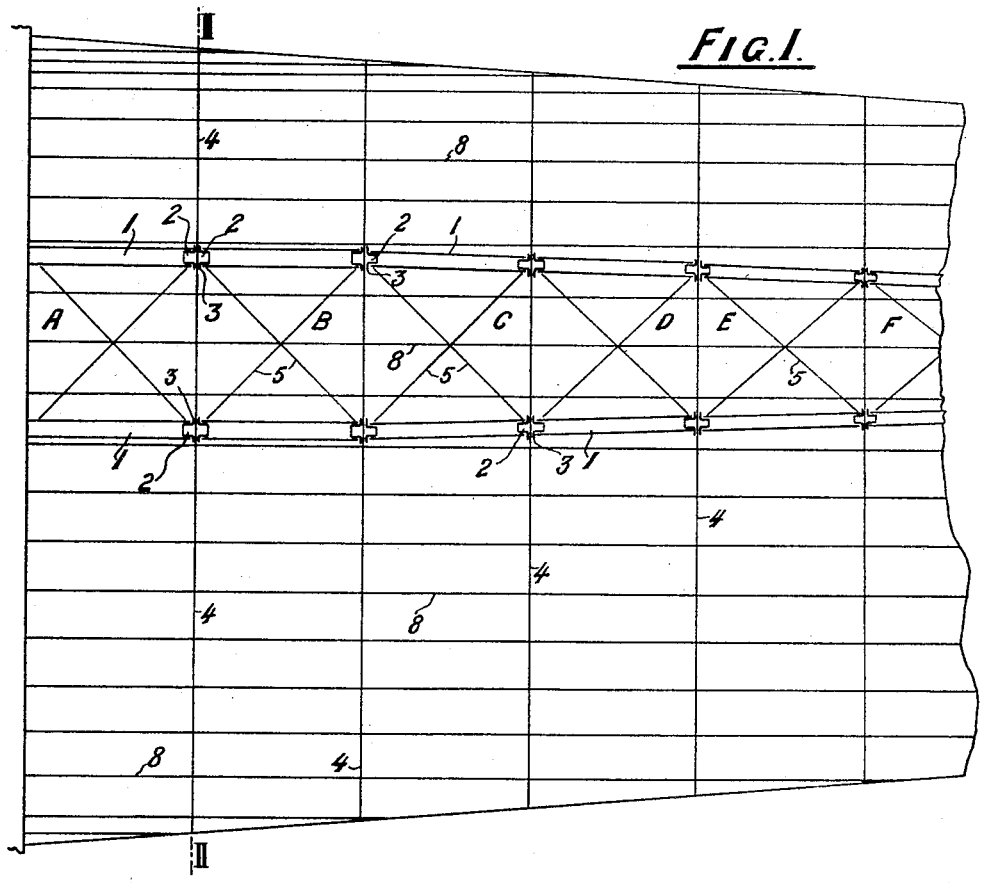

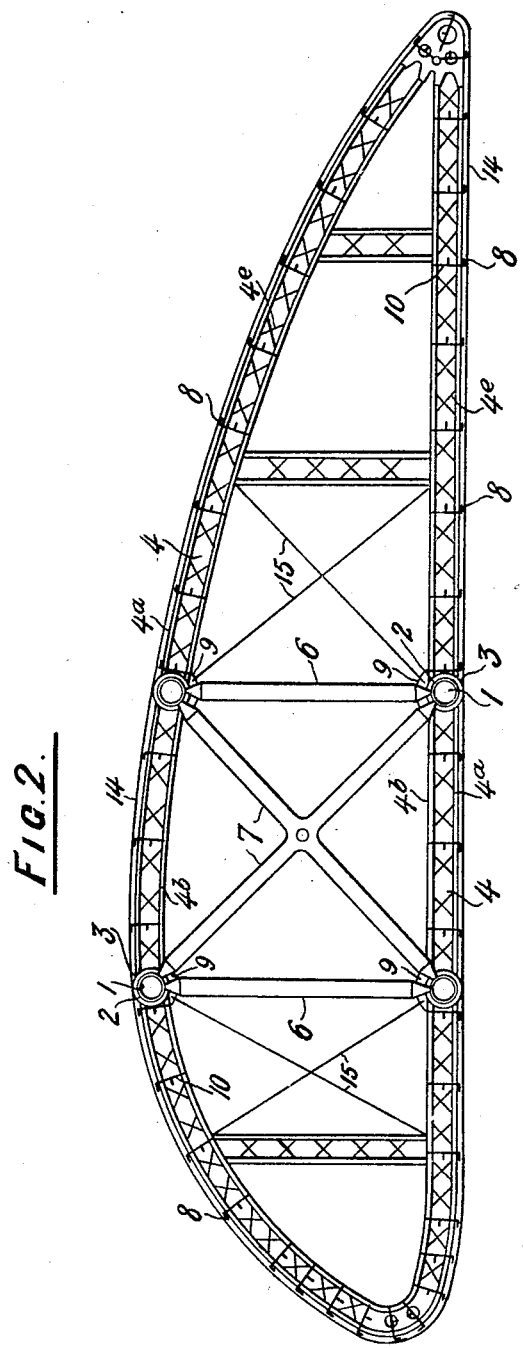

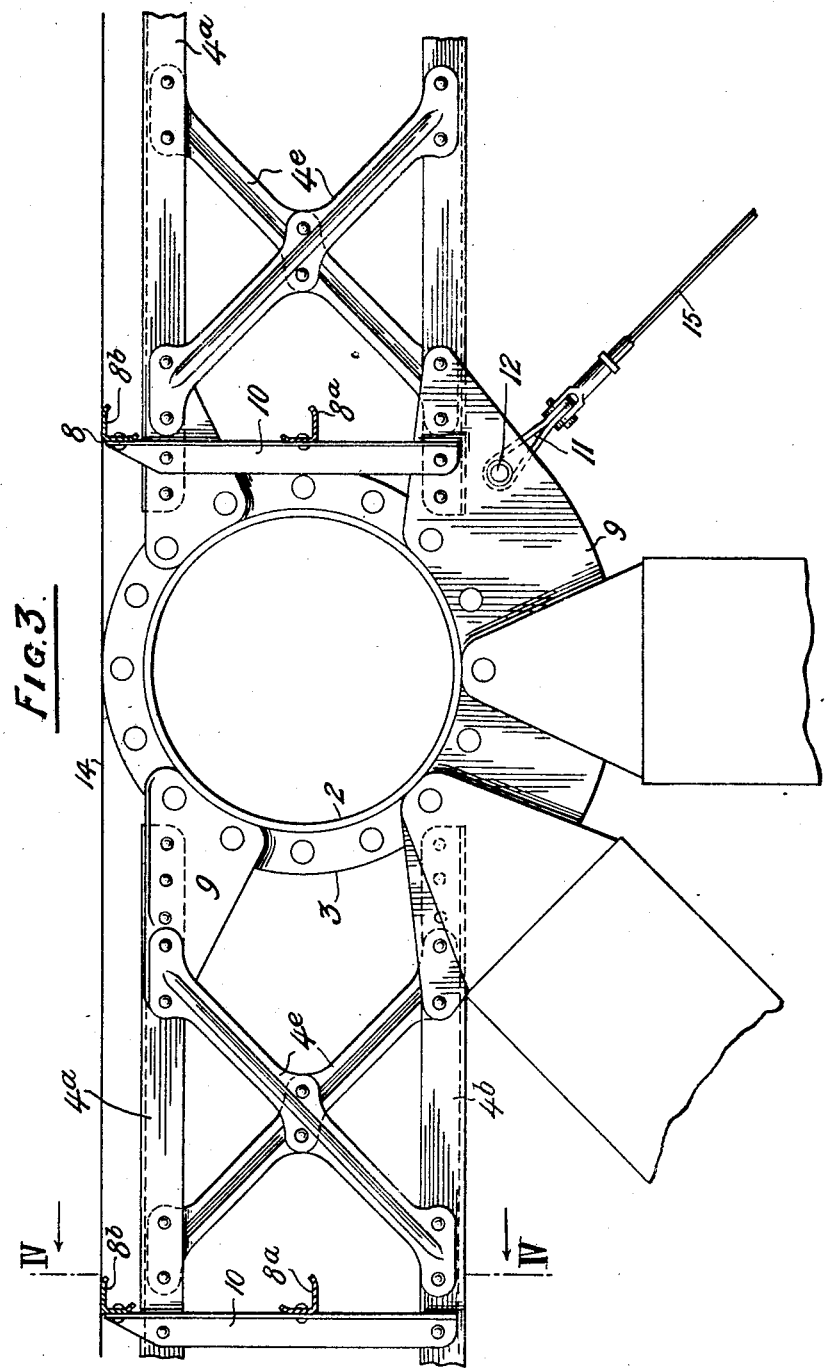

Nov. 24, 1931.    B. N. WALLIS    1,833,696
STRUCTURE OF WINGS FOR AIRCRAFT
Filed Oct. 9, 1930    5 Sheets-Sheet 4
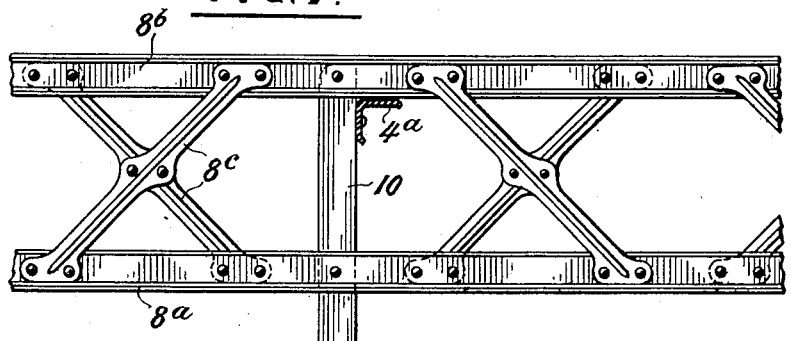
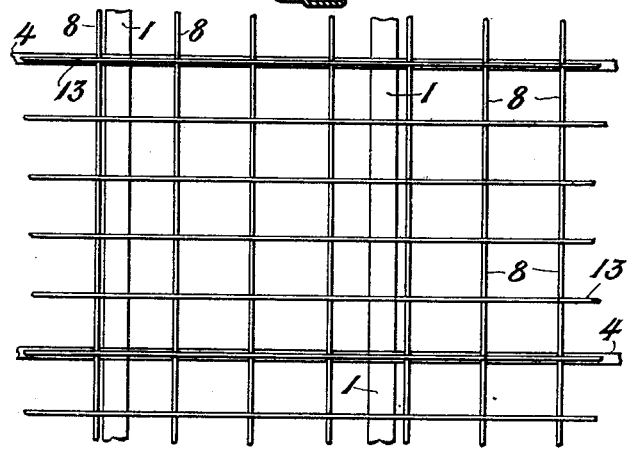
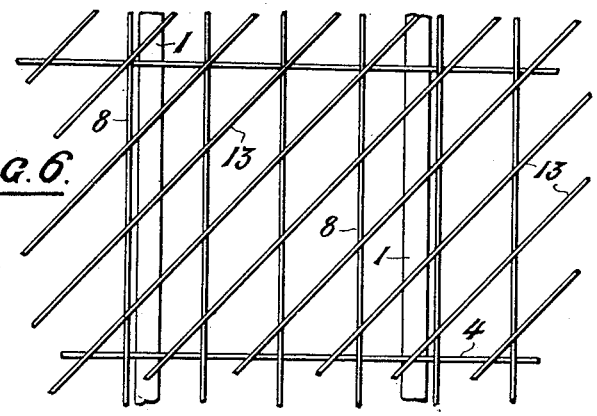

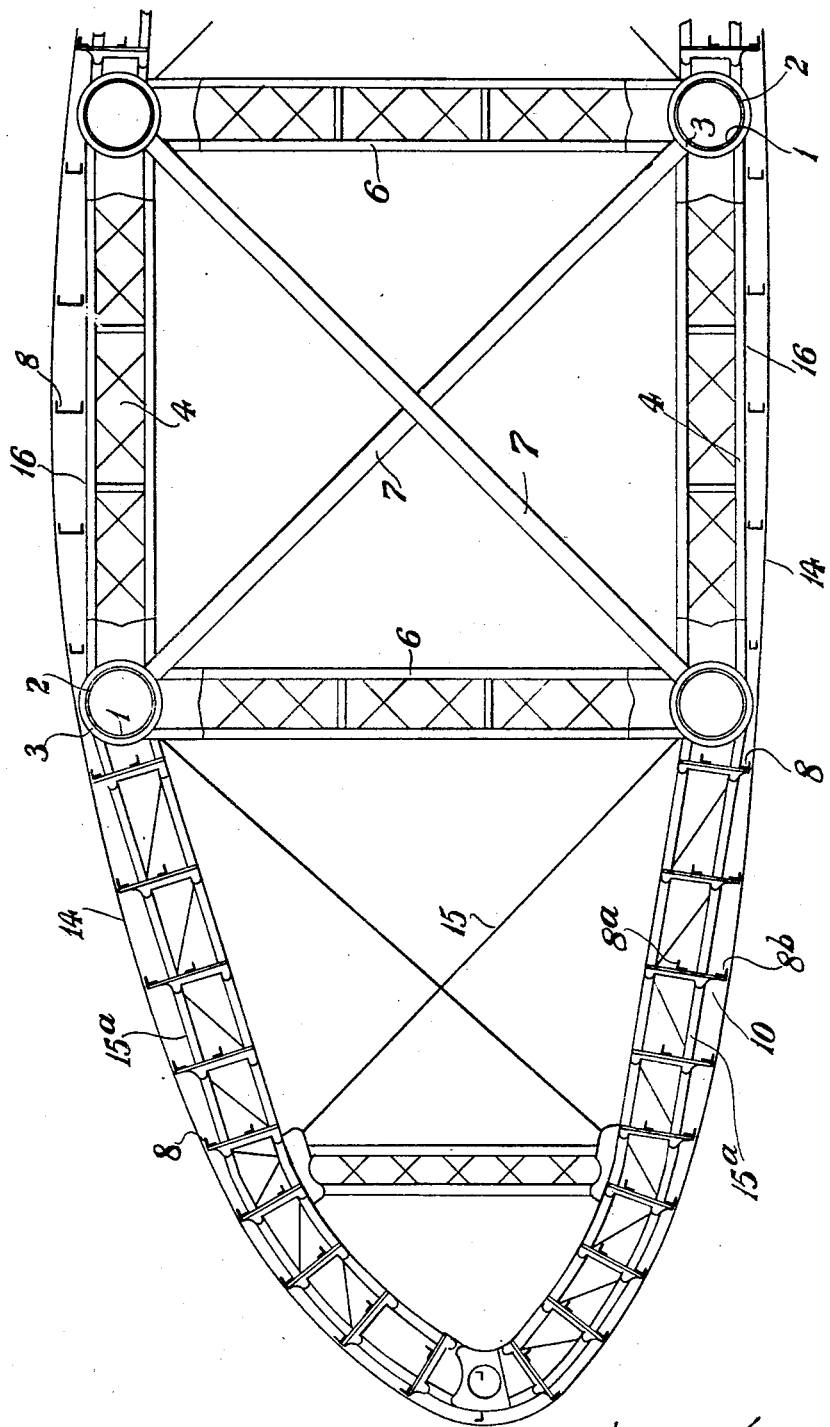

Patented Nov. 24, 1931

1,833,696

UNITED STATES PATENT OFFICE

BARNES NEVILLE WALLIS, OF WEYBRIDGE, SURREY, ENGLAND

STRUCTURE OF WINGS FOR AIRCRAFT

Application filed October 9, 1930, Serial No. 487,581, and in Great Britain October 26, 1929.

This invention relates to improvements in the structure of wings for aircraft, and is particularly applicable to the structure of cantilever wings which extend laterally to right and left of a central fuselage or other body of an aircraft.

It is customary to transmit the lifting and other forces from the aerofoils to the fuselage or hull of an aircraft by means of constructional systems involving the use of one, two, or occasionally more laterally extending members or spars which support a series of ribs, crossing the spars substantially at right angles. These ribs act as the "former" members determining by their shape the form of the aerofoil.

Large numbers of such ribs are generally employed at a relatively close pitch in order to give adequate support to the covering stretched across them when subjected to aerodynamic loads.

Two disadvantages are inherent in this system: firstly, it is only possible economically to build aerofoils of constant cross-section, for if the cross-section of the aerofoil be varied every rib must be of a different size, since the ribs determine the cross-section; and secondly, the pitch of the ribs is determined not by the requirements of strength in the ribs themselves but by the characteristics of the covering. These characteristics are generally such as to demand a close pitch of ribs with correspondingly light rib loading, and it becomes difficult if not impossible to reduce the scantlings of the sections from which the ribs are constructed, to suit the very light loading to which they are subjected.

The present methods of construction therefore tend to limit the shape of the aerofoil, to maintain relatively high constructional costs, and to involve the use of heavier sections than are actually required.

According to the present invention, these difficulties are overcome by providing, in combination, spars extending throughout the spar of the wings, ribs connected transversely on the spars, stringers connected to the ribs in the direction of the span, and an outer covering attached around the stringers.

With such a wing structure the ribs can be considerably distanced from each other, and, although these ribs may still require to be made of different sizes, in accordance with the variation in cross-section of the wing, it is nevertheless economical to construct the aerofoil of varying cross-section owing to the great reduction in the number of ribs required. The distance apart of the ribs and the strength of the ribs can be determined solely by the loading of the ribs. Moreover, advantage can be taken of the variation in pressure on the upper and the under surface of the wing when the aircraft is in flight, the reduced pressures experienced towards the trailing edge allowing the stringers to be placed relatively far apart at these parts of the wings, while the desired streamline form is maintained by the flexibility of the covering and the air pressure acting thereon, which allows of a considerable saving in the amount of material used in the construction of the wing.

Light flexible battens may also be provided attached transversely, that is, in a fore and aft or diagonal direction to the stringers.

In order that the structural profile of the wings may be shaped to any desired form while distributing the stresses from one part of the structure to an adjacent part and at the same time allowing the parts of the structure to be easily interconnected, the spars are arranged in bays, each bay comprising tubular booms which are connected to continuing tubes in the adjacent bays, and the ribs are then supported at the junctions of the bays. The spar thus formed of prismatic shape may be provided with cross bracings of the "wire" or "strut" type arranged diagonally between opposite corners of each face of the prism.

In a practical embodiment, the wing comprises spars composed of thin tubular members arranged in bays some or all of which are of non-rectangular shape, each tubular member terminating in strengthening sleeves adapted to connect the tubular members in one bay to the continuing tubular member of the adjacent further bay, the strengthening sleeves being formed with flange terminations, all the opposed flange terminations at each end of each bay being contained in a single plane transverse to the spar, means for clamping the flange terminations of the sleeves in one bay to the flange terminations of the sleeves in the adjacent bay, ribs fixed to the flange terminations at the junction of the bays and extending transversely of the spars, stringers connected to the ribs in the direction of the spar and an outer covering around the stringers.

The spar which extends laterally from the fuselage or hull of the aircraft (hereinafter termed "fuselage") is designed to transmit the principal loads consisting of lifting or inertia forces, torsion and drag loading from the wing structure to the fuselage, and in the case of a tapered monoplane wing, might be of greatest cross-section at its root or inboard and where it is connected to the fuselage, diminishing in cross section outwards towards the tip of the wing.

The invention will now be described with reference to the accompanying drawings in which:—

Fig. 1 is a plan view illustrating diagrammatically part of a monoplane wing showing the tubular members arranged in bays and connected together to form the spar, the ribs connected at the junctions of the tubular members, and the stringers.

Fig. 2 is a cross-section on line II—II in Fig. 1. showing diagrammatically the profile of the wing.

Fig. 3 is a fragmentary view of the junction between two tubular members drawn to an enlarged scale to show the mode of joining the parts and the construction of the ribs, stringers and the means for connecting these one to the other.

Fig. 4 is a cross-section on line IV—IV in Fig. 3 showing the construction of the stringers.

Fig. 5 is a fragmentary plan view showing the ribs and stringers and illustrating battens applied fore and aft and fixed to stringers for supporting the outer cover.

Fig. 6 is a similar view to Fig. 5 but illustrates battens which are arranged diagonally of the wing structure instead of fore and aft.

Figure 7 is a similar view to Figure 2, showing diagrammatically a fragment of the profile of a modified form of the wing.

As illustrated in the accompanying drawings, the spar is built up of a number of tubular members 1, each of which may, for example, be made from a narrow strip of metal bent into helical form so as to constitute a tube. The tubular member so formed can be readily made to any desired gauge or thickness of metal or size in diameter so that the strength of the tubular member can be graded to suit the forces imposed on the section of the member in which it is located. Each tubular member is provided with a strengthening sleeve 2 at each end by which it can be connected to the tube of an adjacent section. The strengthening sleeve 2 is made with a flange termination 3, the outer surface of which flange subtends a predetermined angle to the axis of the tube so that the tubes can extend at any desired angle relative to each other. The flanges of adjacent tubular members are clamped together.

The tubular members are arranged in bays marked A, B, C, D, E and F, and each bay may comprise any number of these tubular members located at any particular angular relationship according to the design of the structure, but we will consider, for example, a bay built-up of four such tubular members disposed two at the top and two at the bottom with the tubular members at the top and bottom spaced apart transversely. As shown, the tubular members in the bays A and B are in continuous alignment while those in the bays C, D, E and F are also in continuous alignment with each other, but are disposed at a change of angle relatively to the tubular members in the bays A and B. Thus the bays C, D, E, and F are non-rectangular. With such an arrangement and by using strengthening sleeves with flange terminations as hereinbefore described, the flange terminations 3 of the sleeves in the four tubes at the end of each bay can be so arranged that the flange terminations are in the same transverse plane and are also in the same plane as the opposed flange terminations of the sleeves on the tubes in the next adjacent bay. The ribs 4 may thus be secured to the tubular members by being clamped between the flange terminations.

The spar may be braced by providing bracing members 5 which extend diagonally across and are fixed to the strengthening sleeves. The tubular members are also stayed apart and braced at the upper and lower edges of the wing by the ribs 4 and by the upright members 6 and diagonal members 7 which are also fixed at their ends to the flange terminations of the sleeve.

The stringers are indicated by the lines 8 in Fig. 1 and extend in the direction of the span of the wing.

In the preferred embodiment the ribs are constructed of hollow skeleton girders each comprising two angle members shown more clearly in Fig. 4 and marked $4^a$ and $4^b$ and connected together by means of pressed bracing pieces $4^e$ in a manner known in connection with aircraft construction. In this case the ribs are made up in four sections, the leading edge section, and upper central section, a lower central section and a trailing section, as shown in Fig. 2. These sections are connected to the flange terminations of the strengthening sleeves by means of plates 9.

The stringers are preferably each composed of an inner angle member 8ª, and an outer angle member 8ᵇ connected by pressed bracing pieces 8ᶜ which are similar to the pressed bracing pieces 4ᵉ of the girders constituting the ribs. The stringer frames so constructed are attached to each rib by means of an angle carrying member 10, one flange of which rests against and is fixed to the angle members 4ª and 4ᵇ and the other flange of which rests against and is fixed to the angle members 8ª and 8ᵇ of the stringer frame. The component parts of the structure are all connected together by means of rivets as shown.

The ribs are internally braced by bracing members 15, in the plane of the ribs which bracing members are each connected at one end by a stirrup 11 and a projection 12 to one of the plates 9, and at the other end by suitable means to one of the angle members 4ᵇ.

In the event of a textile covering being used, in addition to the stringers, battens 13 may be provided either arranged as shown in Fig. 5 to extend across the stringers in a fore and aft direction, or as shown in Fig. 6 in a diagonal direction. In this case the battens support and give shape to the textile covering.

In a case where the wing is non-uniform in cross-section, such as for instance, where the wing tapers to its outer end as shown in Fig. 1, the stringers at or adjacent the tapering parts of the structure may be carried on for a part only of the distance, as indicated in Fig. 1, or alternatively, they may diminish in section and be arranged to approach each other as they proceed from the wing root to the wing tip so as to accommodate themselves to the form of the wing.

The ribs need not be shaped to the wing profile, since the cross-section of the profile is determined by the position of the stringers. Thus, with ribs which are not shaped to correspond exactly with the wing profile but as shown for example in Figure 7 of the accompanying drawings, have the outsides of the ribs flat at 15ª and 16, the stringers themselves will be so arranged that a fair curve joining their outer edges in a fore and aft direction gives the required cross-section to the aerofoil.

The exterior contour formed by the stringers or battens is automatically assumed by any flexible material which may be bent or fixed upon them to form the outer surface of the wing. The outer covering is marked 14 on the drawings.

It will be readily appreciated that wings constructed substantially as described may be designed to have all their parts made by "production" methods, a minimum number of different parts being required; while since redundancy is rendered impossible every element may be so calculated as to utilize the material of construction in the most economical manner.

This structure is especially suitable for manufacture in any of the well known steel or aluminium alloys, and permits of cantilever wings being made with greater rigidity and lighter weight per unit of area than has hitherto been considered posssible in any practicable form suitable for mass production.

What I claim as my invention and desire to secure by Letters Patent is:—

1. Wings for aircraft comprising, in combination, spars composed of thin tubular members arranged in bays some of which bays are of non-rectangular shape, strengthening sleeves at the terminations of each tubular member adapted to connect the tubular members in one bay to the continuing tubular members of the adjacent further bay, the strengthening sleeves being formed with flange terminations, all the opposed flange terminations at each end of each bay being contained in a single plane transverse to the spar, clamping means for the flange terminations of the sleeves in the adjacent bays, ribs fixed to the flange terminations at the junctions of the bays and extending transversely of the spars, stringers connected to the ribs in the direction of the span and an outer covering around the stringers.

2. Wings for aircraft comprising, in combination, spars extending throughout the span of the wings, ribs shaped in profile only approximately to that of the wing profile and connected transversely on the spars, stringers connected to the ribs and protruding to such an extent as to determine the required cross-section of the wing in the direction of the spar some of which stringers adjacent to the sides of the wing extend for a part only of the span so as to accommodate themselves to the form of the wing, and a flexible outer covering around the stringers and shaped to the required contour by the stringers.

3. Wings for aircraft comprising in combination, spars extending throughout the span of the wings, ribs shaped in profile only approximately to that of the wing profile and connected transversely on the spars, stringers connected to the ribs and protruding to such an extent as to determine the required cross-section of the wing some of which stringers approach each other as they become distanced from the wing root so as to accommodate themselves to the form of the wing, and a flexible outer covering around the stringers and shaped to the required contour by the stringers.

4. Wings for aircraft comprising, in combination, spars composed of thin tubular members arranged in bays some of which bays are of non-rectangular shape, strengthening sleeves at the terminations of each tubular member adapted to connect the tubular members in one bay to the continuing tubular members of the adjacent further bay, the strengthening sleeves being formed with flange terminations, all the opposed flange terminations at each end of each bay being contained in a single plane transverse to the spar, clamping means for the flange terminations of the sleeves in the adjacent bays, ribs fixed to the flange terminations at the junctions of the bays and extending transversely of the spars, stringers connected to the ribs in the direction of the spar some of which stringers adjacent to the sides of the wing extend for a part only of the span so as to accommodate themselves to the form of the wing, and an outer covering around the stringers.

5. Wings for aircraft comprising, in combination, spars extending from a wing root to a wing tip composed of thin tubular members arranged in bays some of which bays are of non-rectangular shape, strengthening sleeves at the terminations of each tubular member adapted to connect the tubular members in one bay to the continuing tubular members of the adjacent further bay, the strengthening sleeves being formed with flange terminations, all the opposed flange terminations at each end of each bay being contained in a single plane transverse to the spar, means for clamping the flange terminations of the sleeves on one bay to the flange terminations of the sleeves in the adjacent bay, ribs fixed to the flange terminations at the junctions of the bays and extending transversely of the spars, stringers connected to the ribs in the direction of the spar and approaching each other as they become distanced from the wing root so as to accommodate themselves to the form of the wing, and an outer covering around the stringers.

6. Wings for aircraft comprising, in combination, spars extending throughout the span of the wings, ribs connected transversely to the spars, stringers connected approximately at right angles to the ribs and protruding beyond said ribs to such a degree as to determine the required cross-section of the wing and a flexible outer covering around the stringers and shaped to the required contour by the stringers.

7. Wings for aircraft comprising, in combination, spars extending throughout the span of the wings, ribs which are not shaped to correspond exactly with the wing profile connected transversely to the spars, stringers connected to the ribs and protruding to such an extent as to determine the required cross-section of the wing, and a flexible outer covering around the stringers and shaped to the required contour by the stringers.

8. Wings for aircraft comprising, in combination, spars extending throughout the span of the wings, ribs shaped in profile differently to that of the wing profile and connected transversely to the spars, stringers connected approximately at right angles to the ribs and protruding to such an extent as to determine the required cross-section of the wing, and a flexible outer covering around the stringers shaped to the required contour by the stringers.

In witness whereof I have hereunto set my hand.

BARNES NEVILLE WALLIS.